United States Patent [19]

Möllmann

[11] Patent Number: 5,053,120
[45] Date of Patent: Oct. 1, 1991

[54] ARRANGEMENT FOR DRAINING WATER COLLECTING IN THE CONTAINER OF A WATER SEPARATOR OF AN INTERNAL-COMBUSTION ENGINE

[75] Inventor: Helmut Möllmann, Friedrichshafen, Fed. Rep. of Germany

[73] Assignee: MTU Motoren- und Turbinen-Union Friedrichshafen GmbH, Fed. Rep. of Germany

[21] Appl. No.: 652,597

[22] Filed: Feb. 8, 1991

[30] Foreign Application Priority Data

Feb. 28, 1990 [DE] Fed. Rep. of Germany ....... 4006216

[51] Int. Cl.$^5$ .............................................. B01D 35/00
[52] U.S. Cl. ..................... 210/86; 123/253; 210/104; 210/114; 210/116; 210/117; 210/119; 210/307; 210/312; 210/313; 210/416.4; 210/535; 417/36; 417/41; 222/249
[58] Field of Search ..................... 210/416.4, 535, 307, 210/312, 313, 104, 117, 119, 744, 114, 116, 86; 123/25 A, 25 J, 577, 587; 417/36, 41, 46

[56] References Cited

U.S. PATENT DOCUMENTS

| 4,334,989 | 6/1982 | Hall | 210/116 |
| 4,447,321 | 5/1984 | Jackson | 210/114 |
| 4,502,956 | 3/1985 | Wilson et al. | 210/248 |
| 4,539,109 | 9/1985 | Davis | 210/184 |
| 4,637,351 | 1/1987 | Pakula | 210/114 |
| 4,842,167 | 6/1989 | Fornasari | 222/249 |

FOREIGN PATENT DOCUMENTS 3217162 10/1983 Fed. Rep. of Germany .
3740804 6/1989 Fed. Rep. of Germany .

Primary Examiner—Robert A. Dawson
Assistant Examiner—Sun Uk Kim
Attorney, Agent, or Firm—Evenson, Wands, Edwards, Lenahan & McKeown

[57] ABSTRACT

The invention relates to an arrangement for the automatic removal of water collecting in a fuel filter having a water separator. The evacuation takes place by means of a piston acted upon by a pressure medium, preferably a fuel pressurized by the pressure of the fuel pump, the piston being guided in the container of the fuel filter containing the water. It is particularly advantageous for an already existing drive to be usable for producing the pressure medium and that therefore a simple and inexpensive solution is offered for the removal of the water.

17 Claims, 1 Drawing Sheet

ARRANGEMENT FOR DRAINING WATER COLLECTING IN THE CONTAINER OF A WATER SEPARATOR OF AN INTERNAL-COMBUSTION ENGINE

BACKGROUND AND SUMMARY OF THE INVENTION

The invention relates to an arrangement for the automatic draining of water quantities collected in a container which are precipitated, for example, in a filter arrangement for fuel systems from the fuel for internal-combustion engines.

An arrangement of this type is known, for example, from the German Patent Document DE-OS 32 17 162. The water separated by a fuel filter, because of the force of gravity, collects in the lower part of a container comprising the filter element. When the water reaches a given level, a shut-off device is opened up either mechanically by a float or electromagnetically by the signals of a sensor sensing the height of the water level, by means of which shut-off device the water is sucked off while utilizing the vacuum existing in the intake pipe of the internal-combustion engine. However, it is also suggested to use a separate pump. This pump can then be connected at the same time as the shut-off device is actuated to open. A time function element may also be connected into the electric circuit which holds the shut-off arrangement open for a given time for the discharge of a defined amount of water. It is a disadvantage of this arrangement that the vacuum in the intake pipe is not always sufficient for actually sucking the water off to the desired extent, and the use of a separate pumping arrangement is expensive. In the German Patent Document DE-OS 32 17 162, the use of a pumping arrangement is therefore suggested which operates according to the Venturi principle and which is arranged in the air intake pipe of the internal-combustion engine. This suggested installation is hardly less expensive than a separate pump and, in addition, represents an undesirable flow obstacle in the air intake pipe.

Another arrangement of this type is known from the German Patent Document DE-PS 37 40 804. Here, it is suggested to arrange a Venturi nozzle in the return flow pipe of the fuel pump for the sucking-off of the water, the suction connection of this Venturi nozzle being connected with an immersion pipe which dips into the collected water.

It is an object of the invention to provide a safe and particularly simple arrangement for generating the required pressure difference for the pumping-out of the water.

In order to achieve this object, the invention provides, in an arrangement of the initially described type, a piston which can be displaced in the container of the water separator and the one side of which is acted upon by the pressure of a pressure medium, preferably by the fuel which is pressurized by the fuel pump, and the other side of which borders on the water reservoir containing water to be removed. When the piston is acted upon by pressure, connections to other spaces of the container are preferably closed automatically by a non-return valve and the outlet valve is opened automatically.

In one preferred embodiment of the invention, the water collects on the top side of the piston. The piston moves upward for the draining of the water.

In another preferred embodiment of the invention, the piston has a closable passage. Here, the water collects on the bottom side of the piston. The piston is moved downward for the draining of the water.

These constructions have the advantage that an already existing assembly is used for making available the working medium, specifically preferably the fuel pump and the fuel which is pressurized by the fuel pump. The required components, specifically the piston, connecting lines and valves are relatively simple and inexpensive, and, in particular, a sufficient amount of pressure medium is always available with a sufficient pressure level irrespective of the operating condition of the internal-combustion engine.

Other objects, advantages and novel features of the present invention will become apparent from the following detailed description of the invention when considered in conjunction with the accompanying drawings.

DETAILED DESCRIPTION OF THE DRAWINGS

Figure 1:
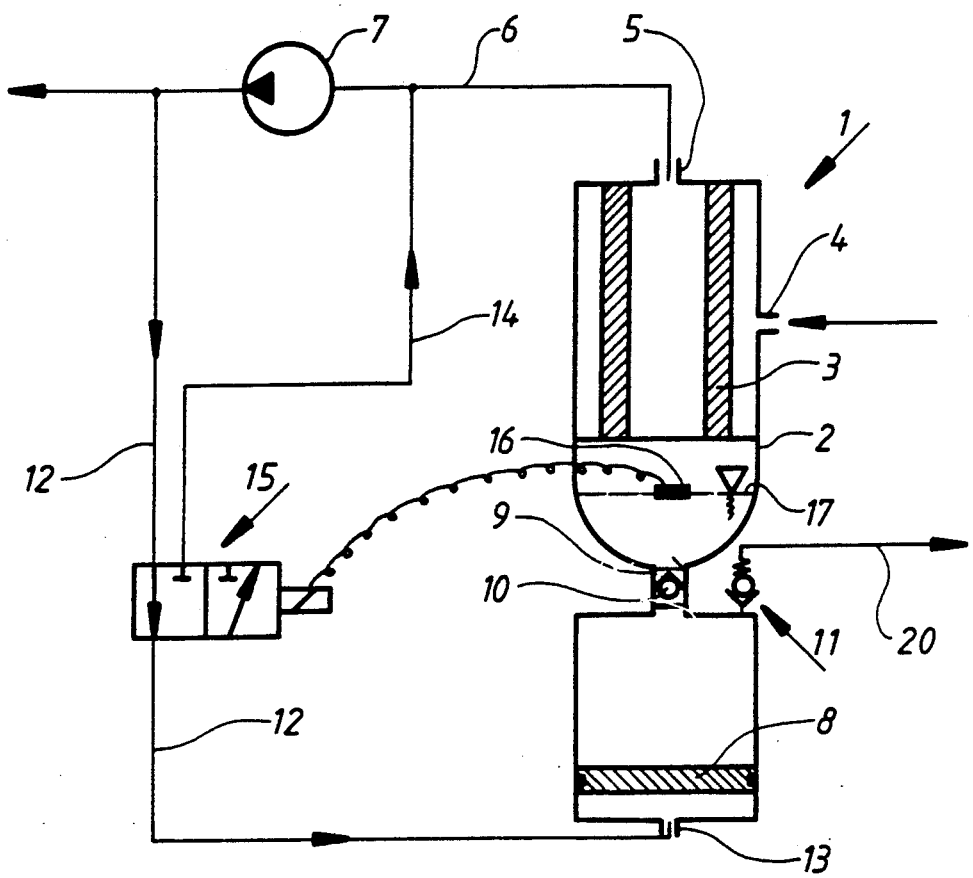
FIG. 1 is a schematic representation of an arrangement in which the water to be drained collects in the space above the piston, constructed according to a first preferred embodiment o the invention.

FIG. 1 illustrates a fuel filter 1 as it is installed in the fuel line system of an internal-combustion engine, for example, between the tank and the suction side of a fuel pump 7. The fuel filter 1 comprises a container 2 in which a filter element 3 is arranged in its upper part. The fuel coming from the fuel tank enters the fuel filter 1 by way of connection 4 and, by way of connection 5 and the fuel line 6, reaches the suction side of the fuel pump 7.

Water precipitated from the fuel collects on the bottom of the container 2 above a piston 8 which is guided in the container 2, and is drained by way of a pipe 20 when a level 17 is reached which is indicated by a dash-dotted line. The water level is sensed by water level sensors 16 by which a valve 15 is actuated.

In the FIG. 1 embodiment, the space on the bottom side of the piston 8 is connected with the delivery side of the fuel pump 7 by way of the pipe 12 and the valve 15. In this case, fuel which is pressurized by the fuel pressure flows in on the bottom side of the piston 8, and the piston 8 moves upward. However, it is also conceivable to use, for example, lubricating oil for the pressure admission to the piston 8. Because of the pressure propagating in the water volume, the non-return valve 10, which is arranged in a bottleneck-type contraction 9 of the container 2, is shut and, as a result, the space which i adjacent to the top side of the piston and is filled with water is closed off with respect to the top part of the container. The spring-loaded non-return valve 11 is kept open by the pressure existing in the water volume, and the water to be drained escapes by way of pipe 20. During the draining of the water, the internal-combustion engine remains in operation. Because of the cross-section of pipe 12, which compared to the fuel line 6 is much smaller, the fuel supply to the cylinders of the internal-combustion engine is not disturbed.

After the intended amount of water is removed, the valve 15 is shut. This may take place after a given time period, for example, by means of a time function element, which is not shown. However, sensors may also be used for this purpose which detect the piston position or a low water level. By means of the switching-over of the valve 15, the space filled with fuel on the bottom side of the piston 8 is connected with the suction side of the fuel pump 7 by pipe 12 and pipe 14. The fuel, which was previously used as a pressure medium, is now sucked off, in which case the piston 8 moves downward into its lower end position. At the same time, the non-return valve 10 opens up and the water which remained above the contraction 9 ma flow into the lower part of the container 2. When the level 17 indicated by the water level sensors 16 is reached again, the described process is repeated.

Figure 2:
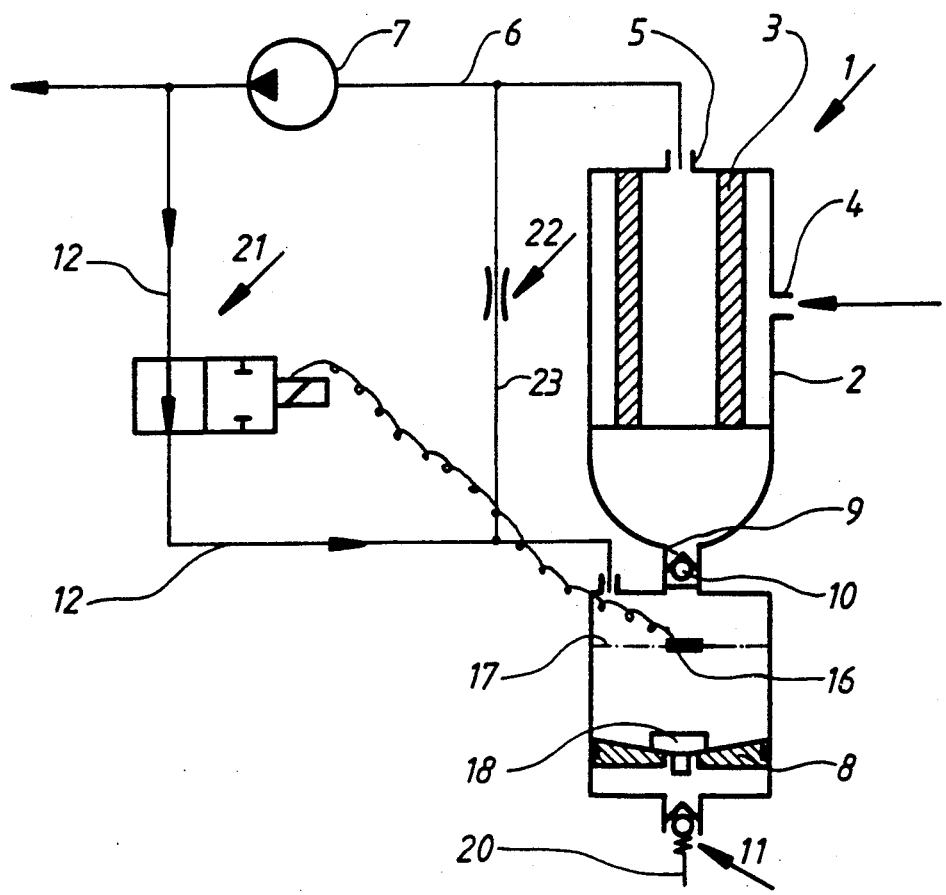
FIG. 2 is a schematic representation of an arrangement corresponding to FIG. 1 in which the water to be drained collects on the bottom side of a piston floating on the water which has a passage for the passing-through of the water, constructed according to a second preferred embodiment of the invention.

In the construction according to FIG. 2, the piston 8 guided in the container 2 is constructed as a floating piston which floats on the surface of the collecting water. At the same time, the piston 8 is situated in the parting plane to the fuel which bounds on top. The specific weight of the piston 8 must therefore be selected to be lower than the specific weight of the water, but higher than the specific weight of the fuel. The top side of the piston 8 is constructed to be slightly funnel-shaped so that the precipitating water flows off toward the center of the piston where a passage permits the passing-through of the water to the bottom side of the piston. In the passage of the piston 8, a closing body 18 is arranged which exposes a ring gap while it also floats on the water. In the representation according to FIG. 2, the space on the top side of the piston 8, by way of the valve 21 and the pipe 12, is connected with the delivery side of the fuel pump 7. The piston 8 moves downward under the fuel pressure. At the same time, the non-return valve 10 is closed in the contraction 9 of the container 2. Because of the pressure existing in the space bordering on the bottom side of the piston 8, the spring-loaded valve 11 is open.

In this FIG. 2 embodiment, the valve 21 is controlled by water level sensors 16. Because of the fuel pressure, the closing body 18 also rests against the passage of the piston 8 so that no fuel can escape to the bottom side of the piston 8. After a given period of time or by means of additional sensors, which are not shown, the valve 21 is switched over. The connection to the delivery side of the fuel pump 7 will then be interrupted. By way of pipe 23 which is connected with the suction side of the fuel pump 7 and contains a throttle 22, the pressure, after the shutting of the valve 21, is reduced in the space adjacent to the piston top side so that the non-return valve 10 can open up. Because of the newly depositing water, the position of the piston 8 rises in the container 2 until the switching-over of the valve 21 is again triggered by water level sensors 16.

Although the invention has bee described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for draining water collecting in a container of a water separator for a fuel system of an internal-combustion engine, the water precipitating in the bottom part of the container because of the force of gravity, comprising:
    a vertically displaceable piston arranged in the container, a first space of the container being adjacent one side of the piston and serving to collect a volume of water to be drained, said first space including an openable outlet for draining water therefrom, a second space of the container being adjacent an opposite side of the piston,
    and pressure medium supplying means for selectively applying pressure medium to said second space to cause the piston to move and force water out of said first space.

2. An arrangement according to claim 1, wherein the pressure medium supplying means includes a fuel pump for the engine.

3. An arrangement according to claim 1, wherein the closing-off of the space situated on the top side of the piston, when pressure is admitted, takes place automatically by means of a non-return valve arranged in a bottleneck-type contraction of the container.

4. An arrangement according to claim 2, wherein the closing-off of the space situated on the top side of the piston, when pressure is admitted, takes place automatically by means of a non-return valve arranged in a bottleneck-type contraction of the container.

5. An arrangement according to claim 1, wherein the outlet for the draining of the water is provided with a spring-loaded non-return valve which opens automatically when pressure is admitted.

6. An arrangement according to claim 3, wherein the outlet for the draining of the water is provided with a spring-loaded non-return valve which opens automatically when pressure is admitted.

7. An arrangement according to claim 4, wherein the outlet for the draining of the water is provided with a spring-loaded non-return valve which opens automatically when pressure is admitted.

8. An arrangement according to claim 1, comprising a valve that can be switched by water level sensors for controlling the admission of the pressure medium to the piston.

9. An arrangement according to claim 2, comprising a valve that can be switched by water level sensors for controlling the admission of the pressure medium to the piston.

10. An arrangement according to claim 3, comprising a valve that can be switched by water level sensors for controlling the admission of the pressure medium to the piston.

11. An arrangement according to claim 7, comprising a valve that can be switched by water level sensors for controlling the admission of the pressure medium to the piston.

12. An arrangement according to claim 1, wherein the piston, during the draining of the water, moves upward, and correspondingly a pressure medium connection leads to the space adjacent to the bottom side of the piston for the admission of the pressure medium.

13. An arrangement according to claim 2, wherein the piston, during the draining of the water, moves upward, and correspondingly a pressure medium connection leads to the space adjacent to the bottom side of the piston for the admission of the pressure medium.

14. An arrangement according to claim 13, wherein, when fuel is used as a pressure medium, the pressure medium connection of the container is connected with the suction side of the fuel pump for the restoring of the piston.

15. An arrangement according to claim 1, wherein the piston floats in the container in the parting plane between the fuel and the water on the water, wherein the piston has a closable passage, and wherein the piston moves downward for the draining of the water, and correspondingly the space adjacent to the top side of the piston can be acted upon by the pressure of the pressure medium, the water outlet being situated on the space of the container adjacent to the bottom side of the piston.

16. An arrangement according to claim 15, wherein the closing body for the piston passage is constructed in the shape of a stopper and, like the piston, floats on the surface of the water, and wherein the closing body places itself sealingly against the piston when the piston top side is acted upon by pressure.

17. An arrangement according to claim 16, wherein the pressure medium supplying means includes a fuel pump for the engine.

* * * * *